United States Patent
Shimazaki

(10) Patent No.: US 9,269,030 B2
(45) Date of Patent: Feb. 23, 2016

(54) JOB PROCESSING APPARATUS AND JOB PROCESSING METHOD

(75) Inventor: Atsushi Shimazaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 354 days.

(21) Appl. No.: 13/207,131

(22) Filed: Aug. 10, 2011

(65) Prior Publication Data

US 2012/0054759 A1   Mar. 1, 2012

(30) Foreign Application Priority Data

Aug. 26, 2010   (JP) .................................. 2010-189456

(51) Int. Cl.
*G06F 9/46*   (2006.01)
*G06K 15/02*   (2006.01)
*G06F 3/12*   (2006.01)

(52) U.S. Cl.
CPC .............. *G06K 15/181* (2013.01); *G06F 3/122* (2013.01); *G06F 3/1213* (2013.01); *G06F 3/1246* (2013.01); *G06F 3/1248* (2013.01); *G06F 3/1285* (2013.01); *G06F 2206/1514* (2013.01)

(58) Field of Classification Search
None
See application file for complete search history.

(56) References Cited

U.S. PATENT DOCUMENTS

| | | | | |
|---|---|---|---|---|
| 2003/0208607 A1* | 11/2003 | Yamazaki | ..................... | 709/229 |
| 2004/0010567 A1* | 1/2004 | Moyer et al. | .................. | 709/219 |
| 2007/0153323 A1* | 7/2007 | Shimazaki | .................. | 358/1.15 |
| 2009/0077169 A1* | 3/2009 | Ikeura et al. | .................. | 709/203 |
| 2009/0097053 A1* | 4/2009 | Saito | ............................ | 358/1.14 |
| 2010/0046841 A1* | 2/2010 | Yamazaki et al. | ............. | 382/203 |
| 2010/0287247 A1* | 11/2010 | Kohring et al. | ............... | 709/206 |

FOREIGN PATENT DOCUMENTS

| | | |
|---|---|---|
| JP | 2005-161860 A | 6/2005 |
| JP | 2009-255390 A | 11/2009 |
| JP | 2009-269259 A | 11/2009 |
| JP | 2010-61462 A | 3/2010 |

OTHER PUBLICATIONS http://xml.coverpages.org/draft-nielsen-dime-01.txt; 2001 ; Nielsen, et al., Oct. 2001.*

* cited by examiner

*Primary Examiner* — Dong Kim
(74) *Attorney, Agent, or Firm* — Canon USA, Inc. IP Division

(57) ABSTRACT

To reduce the load of division position identification processing when executing job processing based on input job data that is divided into multiple parts, a job processing apparatus is configured to identify a division position indicating divisions of the parts in the input job data, and skip the identification of a division position in a processing data portion that is a job processing target among the job data.

9 Claims, 10 Drawing Sheets

FIG. 3

```
POST /print.cgi HTTP/1.1
Mime-Version: 1.0
Content-Type: Multipart/Related; boundary=MIME-boundary;     ─301
           type="application/xop+xml";start="<soap@soap>";start-info="application/soap+xml"
Transfer-Encoding: chunked  ─302
Host: xx.xx.xx.xx
Connection: Keep-Alive
Cache-Control: no-cache
Pragma: no-cache nn  ─303
--MIME-boundary  ─304
Content-Type: application/xop+xml;charset=UTF-8;type="application/soap+xml"
Content-Transfer-Encoding: binary
Content-ID: <soap@soap> nn  ─305
<?xml version="1.0" encoding="utf-8" ?>
SendDocument-Command  ─306
nn  ─307
--MIME-boundary  ─308
Content-Type: application/octet-stream
Content-Transfer-Encoding: binary
Content-ID: <0@body> nn  ─309                                                             310
..................................................
..................................................
p
r
i
n
t
d
a
t
a
..................................................
nn  ─311
--MIME-boundary--  ─312
0  ─313
```

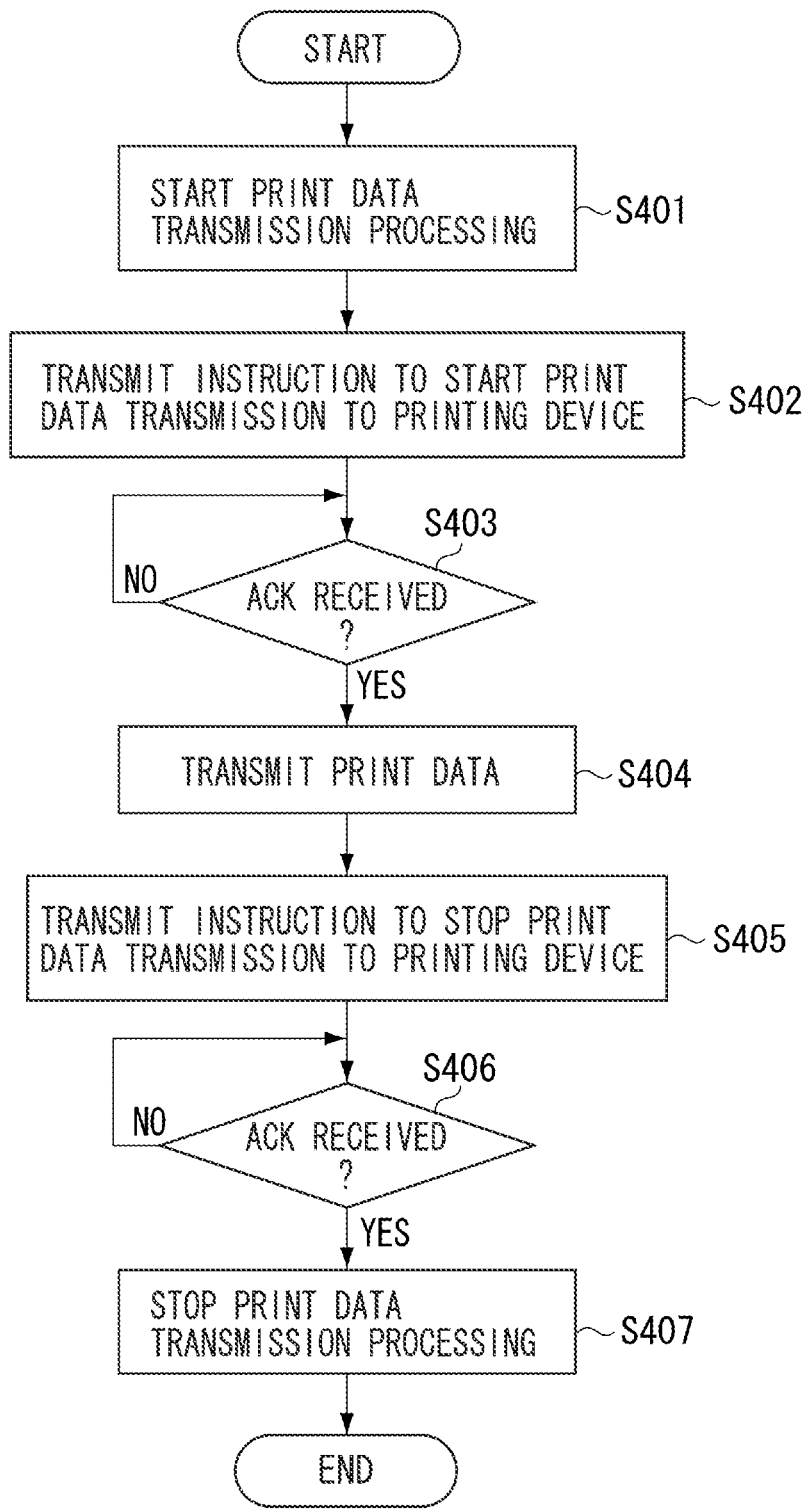

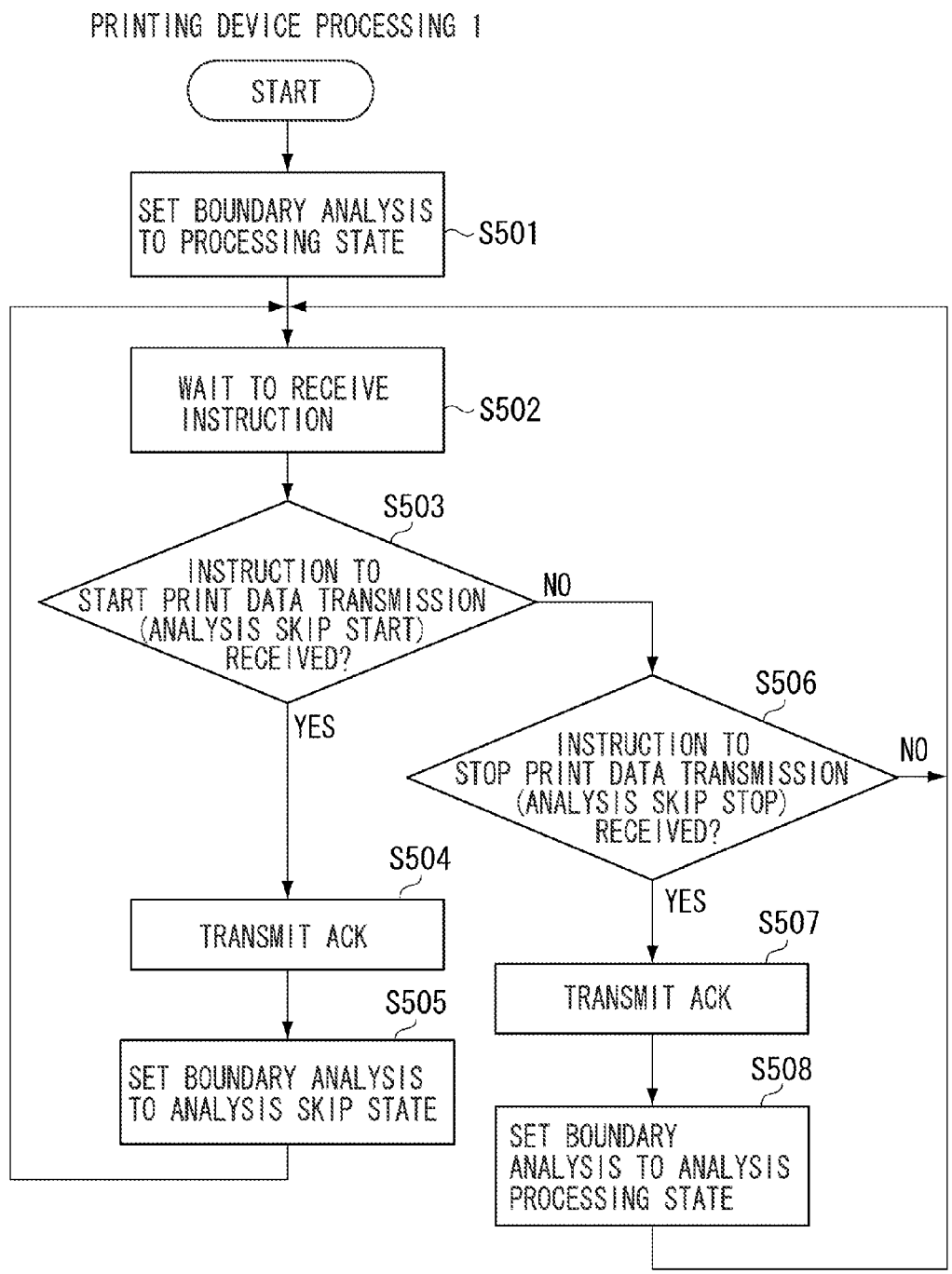

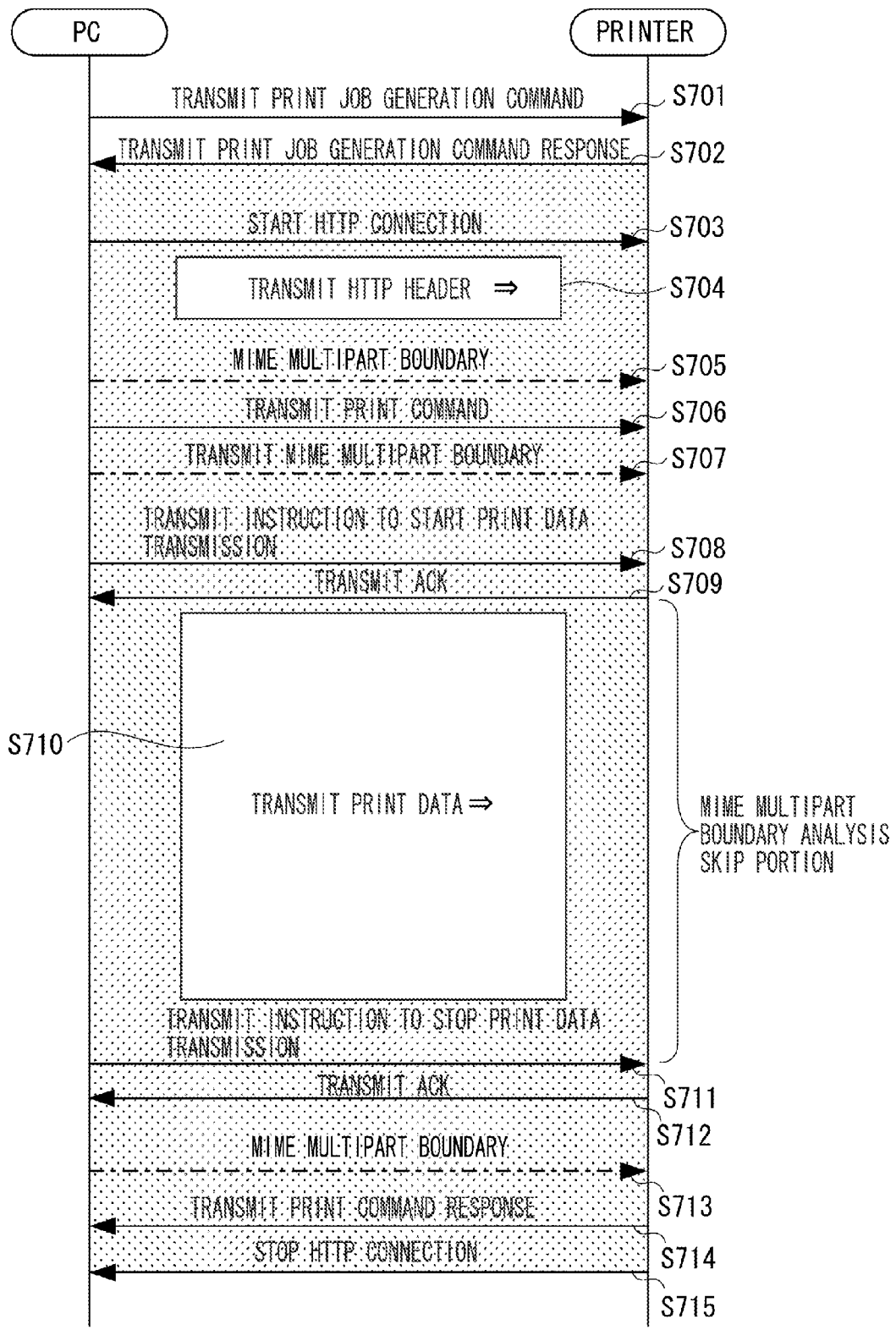

FIG. 8

```
POST /print.cgi HTTP/1.1
Content-Type: application/soap+xml
Host: xx.xx.xx.xx
Content-Length: nn
Connection: Keep-Alive
Cache-Control: no-cache
Pragma: no-cache <?xml version="1.0" encoding="utf-8" ?>
<soap:Envelope>
<soap:Header>
  <wsa:To>http:// xx. xx. xx. xx:xx/print.cgi</wsa:To>
  <wsa:Action>http://xxxx/GetPrinterElements<wsa:Action>          ~801
</soap:Header>
<soap:Body>
  <pri:GetPrinterElementsRequest>
    <pri:RequestedElements>
      <pri:Name>VendorElements</pri.Name>
      <yyyy:VendorElements>
        <yyyy:PrintDataStreamStart>    ~802
          <yyyy:DataStreamMinSize>nnnn</yyyy:DataStreamMinSize>   ~803
        </yyyy:PrintDataStreamStart>
      </yyyy:VendorElements>
    </pri:RequestedElements>
  </pri:GetPrinterElementsRequest>
</soap:Body>
</soap:Envelope>
```

FIG. 9

```
POST /print.cgi HTTP/1.1
Content-Type: application/soap+xml
Host: xx.xx.xx.xx
Content-Length: nn
Connection: Keep-Alive
Cache-Control: no-cache
Pragma: no-cache <?xml version="1.0" encoding="utf-8" ?>
<soap:Envelope>
<soap:Header>
  <wsa:To>http:// xx. xx. xx. xx:xx/print.cgi</wsa:To>
  <wsa:Action>http://xxxx/GetPrinterElements<wsa:Action>    ~901
</soap:Header>
<soap:Body>
  <pri:GetPrinterElementsRequest>
    <pri:RequestedElements>
      <pri:Name>VendorElements</pri.Name>
      <yyyy:VendorElements>
        <yyyy:PrintDataStreamEnd>    ~902
        </yyyy:PrintDataStreamEnd>
      </yyyy:VendorElements>
    </pri:RequestedElements>
  </pri:GetPrinterElementsRequest>
</soap:Body>
</soap:Envelope>
```

JOB PROCESSING APPARATUS AND JOB PROCESSING METHOD

BACKGROUND OF THE INVENTION

1. Field of the Invention

Embodiments of the present invention relate to a job processing apparatus and a job processing method for processing input job data.

2. Description of the Related Art

Conventionally, web service for devices (WSD) has been known as a protocol used when processing job data in a job processing apparatus. WSD is a specification defined in order to address the need for various services using devices. WSD provides services such as a printing service and a scanning service based on a set of defined communication protocols using web service architecture.

In a WSD printing service, a "send document" command for transmitting print data and a "get printer elements" command for acquiring various information about a printer are defined. To exchange these commands, hypertext transfer protocol (HTTP) is used over transmission control protocol/internet protocol (TCP/IP), and simple object access protocol (SOAP) is used over HTTP. Further, commands about services described in extensible markup language (XML) are exchanged utilizing SOAP.

Data divided into multiple parts is used in the same session for the "send document" command for transmitting print data, and for the print data. Data divided into multiple parts is data in a multipurpose internet mail extension (MIME) format. Japanese Patent Application Laid-Open No. 2010-61462 discusses using the data divided into multiple parts to execute job processing.

To execute a job configured from the data divided into multiple parts, it is necessary to identify the division positions, and specify the processing data that will become the job execution target (for a print job, the print data). The identification of the division positions is performed by specifying the division character-strings and sequentially comparing acquired data with these division character-strings.

However, conventionally, since there was no technology to identify the fact that a portion corresponding to the print data is print data, a comparison with the division character-strings had to be performed even for a portion corresponding to the print data. Consequently, the processing load for division character-string (division position) identification was high. Specifically, a division character-string comparison was performed even if there were no division positions in the job execution target data, meaning that unnecessary processing was performed.

SUMMARY OF THE INVENTION

One aspect of the embodiments is directed to providing a job processing apparatus and a job processing method that overcome the above problem.

Another aspect of the embodiments is directed to providing a job processing apparatus and a job processing method that may reduce the load of division position identification processing when executing job processing based on input job data that is divided into multiple parts.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates an example of job data.

FIG. 4 is a flowchart illustrating a flow of processing performed during job data transmission by a PC.

FIG. 5 is a flowchart illustrating a flow of processing performed to switch whether division data analysis by a printing apparatus needs to be performed or not.

FIG. 7 is a sequence diagram illustrating a flow of the exchange of job data between a printing apparatus and a PC.

FIG. 8 illustrates an example of a data format of an instruction to start print data transmission.

FIG. 9 illustrates an example of a data format of an instruction to stop print data transmission.

DESCRIPTION OF THE EMBODIMENTS

Various exemplary embodiments, features, and aspects of the invention will be described in detail below with reference to the drawings.

One disclosed feature of the embodiments may be described as a process which is usually depicted as a flowchart, a flow diagram, a structure diagram, or a block diagram. Although a flowchart may describe the operations as a sequential process, the operations may be performed in parallel or concurrently. In addition, the order of the operations may be re-arranged. A process is terminated when its operations are completed. A process may correspond to a method, a program, a procedure, a method of manufacturing or fabrication, a sequence of operations performed by an apparatus, a machine, or a logic circuit, etc.

Figure 1:
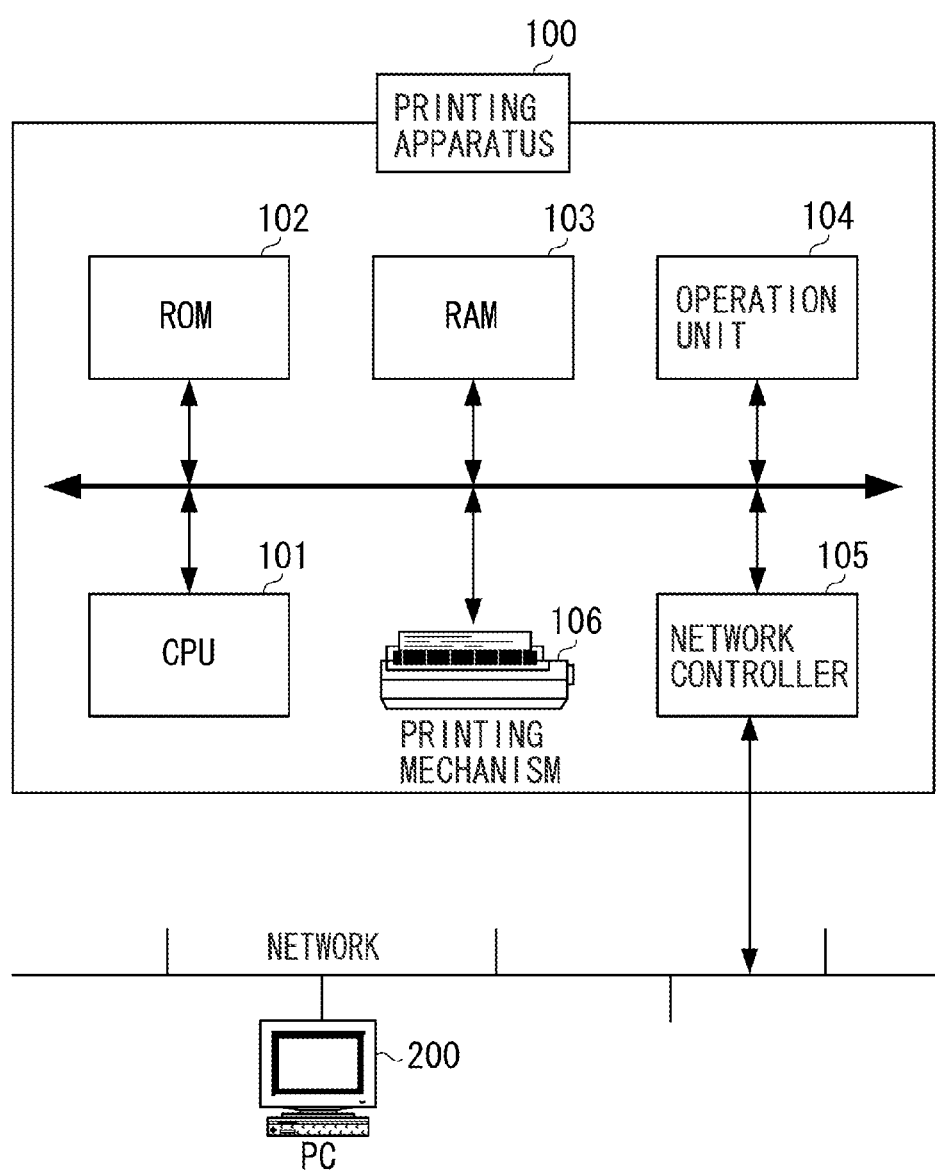
FIG. 1 is a block diagram illustrating a configuration of a printing system, which is an example of an exemplary embodiment.

An example of an exemplary embodiment for embodying the present invention will now be described using the drawings. FIG. 1 is a block diagram illustrating a configuration of a printing system according to the present exemplary embodiment. The printing system illustrated in FIG. 1 includes a printing apparatus 100 for receiving job data and processing jobs, and a personal computer (PC) 200 for supplying job data. The printing apparatus 100 and the PC 200 are connected to each other via a network. Although only one printing apparatus 100 and PC 200 are illustrated in FIG. 1, a plurality of each of these may be provided. Further, the network may be a wired network or a wireless network.

The printing apparatus 100 has a central processing unit (CPU) 101, a read-only memory (ROM) 102, a random access memory (RAM) 103, an operation unit 104, a network controller 105, and a printing mechanism 106. The CPU 101 controls the operation of the whole printing apparatus 100. The ROM 102 stores programs executed by the CPU 101 and information relating to the operation of the printing apparatus 100. In this exemplary embodiment, the ROM 102 is a rewritable ROM. The RAM 103 is used as a CPU 101 work area. In addition, the RAM 103 stores various information including job data. The operation unit 104 receives instructions from a user, and displays information that needs to be presented to the user. The network controller 105 controls the transmission and reception of data via the network. The printing mechanism 106 prints an image using a recording agent on a recording medium based on input print data. The printing mechanism 106 may be separate (in a separate housing) from the printing apparatus 100, and may be locally connected with the printing apparatus 100 or connected via a network.

The PC 200 may be realized by a versatile personal computer. Of the units illustrated as the configuration of the printing apparatus 100, the PC 200 has all of those units except for the printing mechanism 106. Software for generating print data to be supplied to the printing apparatus 100 and performing data exchange and the like via the network is installed in the PC 200.

Figure 2:
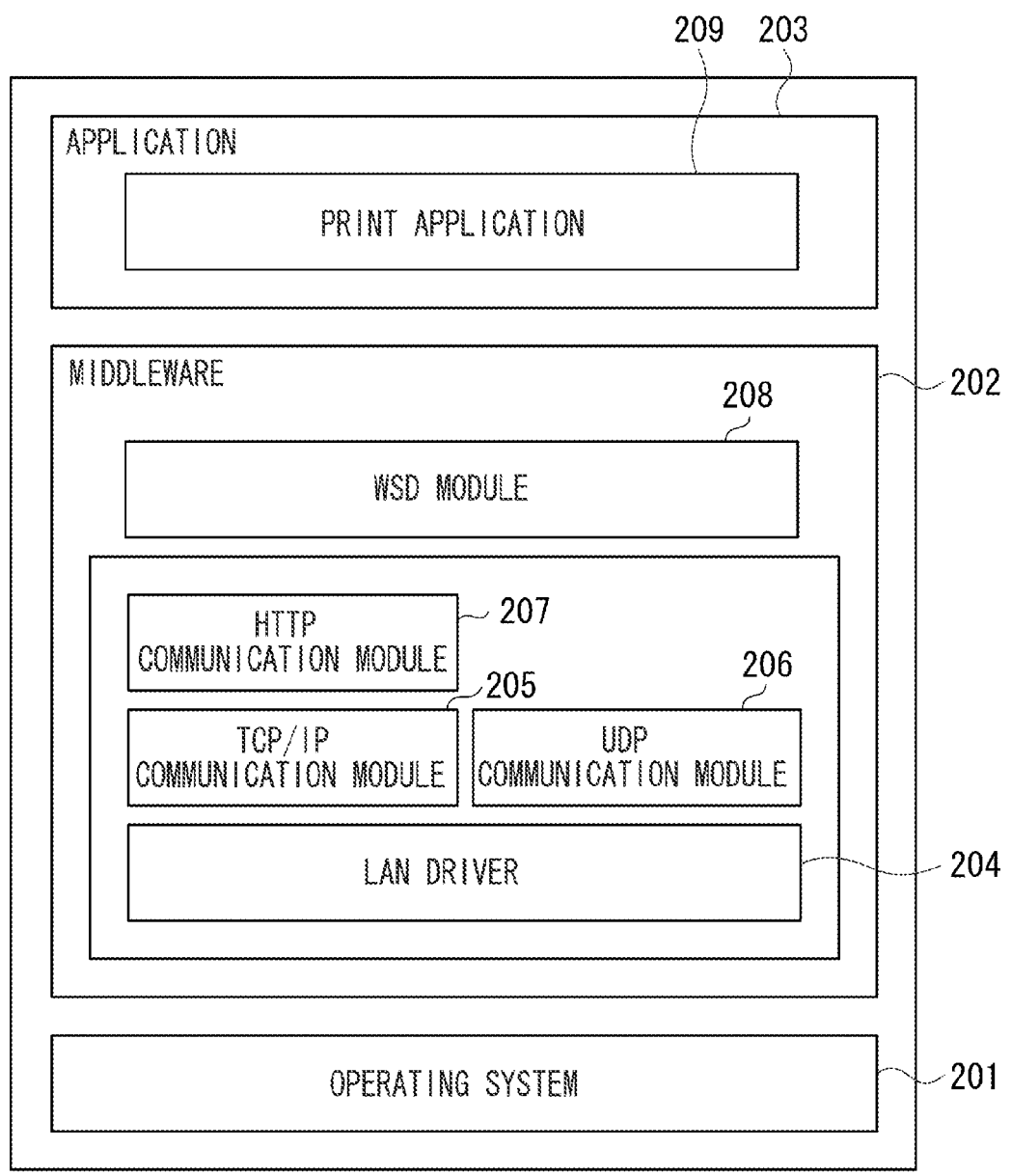
FIG. 2 is a block diagram illustrating a software configuration included in a printing apparatus and a PC.

FIG. 2 illustrates a configuration of the software stored by the printing apparatus 100 and the PC 200 in their own storage device (ROM 102 etc.). An operating system (OS) 201 controls basic operations. In the printing apparatus 100, a real time OS may be used, and in the PC 200, an OS used in a versatile PC may be used. Middleware 202 that is responsible for communication control on the network is in the OS 201, and applications are present above that.

A local area network (LAN) driver 204, which controls the network controller 105, is present in the middleware 202, and above that there are a TCP/IP module 205 which controls communication using TCP/IP and a user datagram protocol (UDP) communication module 206 which controls communication using UDP. Further, above that there is an HTTP communication module 207 which controls communication using HTTP, and above that there is a WSD module 208 which controls a WSD protocol. As an application 203, a print application 209 is present for performing print processing that utilizes the WSD protocol. The print application 209 in the printing apparatus 100 receives print data and executes print processing using the printing mechanism 106. The print application 209 in the PC 200 performs processing for supplying print data to the printing apparatus 100. The print application 209 in the PC 200 also includes a printer driver, which performs control for performing print processing in the printing apparatus 100.

These software (programs) are installed in a storage device, such as the ROM 102, of each apparatus. The CPU 101 of each apparatus executes these software to perform the processing described below.

FIG. 3 illustrates an example of job data received by the printing apparatus 100 (supplied by the PC 200). The job data includes commands and print data for the print processing performed by the printing apparatus 100. The job data is described in XML, and is divided into multiple parts based on a MIME format. When HTTP connection to the printing apparatus 100 is performed from the PC 200, first, the HTTP header information is transmitted from the PC 200 to the printing apparatus 100.

The HTTP header information includes information describing how the data divided into a plurality of parts based on an MIME format should be handled. This information includes a boundary argument (301) for specifying the division character-strings of the data divided into a plurality of parts. In FIG. 3, an arbitrarily-set division character-string is described in a portion indicated by the words "MIME-boundary" in the argument 301. The printing apparatus 100 specifies the division position of each part in the job data by referring to the division character-strings with "MIME-boundary" designated from the PC 200.

Further, the HTTP header information includes a chunk format encoding designation (302) which is included when turning the HTTP entity body into blocks and transmitting it. When it is determined that this designation is included, the printing apparatus 100 recognizes the subsequent entity body to be data encoded in a chunk format, and performs chunk format decoding processing on the data.

In FIG. 3, information 303, 305, 307, 309, 311, and 313 indicate the chunk size of the chunk format-encoded data. The printing apparatus 100 receives this data divided into the respective sizes designated by these chunk sizes. The size 0 described in information 313 indicates the end of the entity body. When the printing apparatus 100 receives this, the printing apparatus 100 recognizes that the data is at an end, and stops the job data reception processing.

Further, in FIG. 3, the same division character-string as the MIME-boundary indicated by information 301 is described in information 304, 308, and 312. With this division character-string as a boundary, each of the plurality of data parts is transmitted from the PC 200 to the printing apparatus 100. The section marked between information 304 and 308 includes the print command indicated in information 306. The section marked between information 308 and 312 includes the print data indicated in information 310. The printing apparatus 100 specifies the data of each part based on the division character-string designated by the HTTP header information, and performs processing based on the data contents of the respective parts. More specifically, for the print command 306, the printing apparatus 100 performs processing such as setting based on the command, and for print data, the printing apparatus 100 analyzes the print data, performs rasterization processing for printing, and performs print processing using the printing mechanism 106. Various formats may be used as the print data format, such as a page description language (PDL) format and a raster format.

Next, the flow of the processing performed when the PC 200 transmits job data to the printing apparatus 100 will be described using FIGS. 4 and 7 to 9. This processing is performed by the CPU 101 in the PC 200 loading into the RAM 103 the set of software programs illustrated in FIG. 2 which are stored in the ROM 102, for example, and executing those programs.

The flowchart illustrated in FIG. 4 starts when the user prepares the data to be printed using the print application 209 and instructs printing to be performed based on WSD from a print menu for that application. In operation S401, when the printing apparatus 100 is designated from the print application 209 and a printing instruction is issued, the printing device 100 instructs the OS 201 to start the transmission processing of the data to be printed. When the OS 201 receives the instruction to start the transmission processing of the print data, based on that instruction, the OS 201 automatically transmits a PrintJob generation command (S701) illustrated in FIG. 7 to the printing apparatus 100 (FIG. 7 will be described below). When the PrintJob is successfully generated, the OS 201 performs an HTTP connection with the printing apparatus 100, and among the job data illustrated in FIG. 3, transmits the job data prior to information 309 (information 309 is not transmitted).

Next, in operation S402, the print application 209 performs a new HTTP connection to the printing apparatus 100, and then transmits an instruction (signal) to start print data transmission to the printing apparatus 100. In operation S403, the print application 209 waits for an Ack response from the printing apparatus 100 indicating that the printing apparatus 100 may receive print data. At this stage, the HTTP connection started in operation S401 is maintained as is. When the instruction to start print data transmission is transmitted in operation S402, the printing apparatus 100 may grasp that, from among the job data, the data to be received from then onwards is print data (data to be printed), and may also grasp the start position of the print data. Further, the instruction to start print data transmission transmitted at this stage is transmitted from the PC 200 to the printing apparatus 100 by a procedure different from the exchange performed based on the HTTP protocol illustrated in FIG. 3. Specifically, based on a session separate from the HTTP connection for transmitting job data illustrated in FIG. 3, the HTTP connection is performed to transmit the instruction to start print data transmission. This is because this instruction is an instruction that originally is not used in WSB processing. However, this instruction may be sent within the same session. Further, the instruction to start print data transmission may be based on a procedure other than HTTP, and may be communicated via a separate interface (I/F). However, by using an HTTP procedure, the procedure is the same as that for transmitting the job data, which facilitates control. In the present exemplary embodiment, to facilitate control, in the WSD protocol, a command is used that may transmit and receive over an HTTP connection which is separate from the HTTP connection for the transmission of the job data. More specifically, a GetPrinterElements command is used.

FIG. 8 illustrates an example of a data format of an instruction to start print data transmission. The instruction illustrated in FIG. 8 is applied to an instruction to start print data transmission based on a GetPrinterElements command (a printer information acquisition command) in the WSD protocol. In FIG. 8, information 801 indicates a printer information acquisition command for data in the WSD protocol. In the present exemplary embodiment, this command combines transmission of the instruction to start print data transmission from the PC 200 as one printer information, and acquisition of Ack information for that instruction. Information 802 indicates that the contents of the printer information transmitted by this command is an instruction to start print data transmission and is a request for an Ack response. Further, information 803 indicates the minimum chunk size for analyzing the character strings divided into MIME parts. The printing apparatus 100 makes a determination using this designated size, which will be described in more detail below.

Returning to FIG. 4, in operation S403, when an Ack to the instruction to start print data transmission is received from the printing apparatus 100 (YES in operation S403), the print application 209 closes the HTTP connection started in operation S402. Then, in operation S404, the print application 209 instructs the OS 201 to transmit the print data. The OS 201 then sequentially transmits the chunk size 309 illustrated in FIG. 3 and the print data 310 corresponding thereto to the printing apparatus 100. The print data 310 may be divided into a plurality of chunks. In such a case, data indicating the size of each chunk is added. If an Ack is not transmitted even after a predetermined duration has elapsed, the print application 209 determines that a time out error has occurred, and finishes the processing.

When transmission of the print data has finished, in operation S405, the print application 209 performs a new HTTP connection to the printing apparatus 100, and then transmits an instruction (a signal) to the printing device 100 to stop print data transmission. In operation S406, the print application 209 waits for an Ack response from the printing apparatus 100 acknowledging the instruction to stop print data transmission. Consequently, the stop position of the print data may be grasped. The instruction to stop print data transmission is in the format illustrated in FIG. 9. The GetPrinterElement command is applied to the present exemplary embodiment. However, a command other than the GetPrinterElement command is also useful, which is the same as the instruction to start print data transmission, and thus a detailed description thereof will be omitted here. In FIG. 9, information 901 indicates that the data is a printer information acquisition command in the WSD protocol. Information 902 indicates that the contents of the printer information transmitted by this command are an instruction to stop print data transmission and a request for an Ack response.

In operation S406, when an Ack to the instruction to stop print data transmission is received from the printing apparatus 100 (YES in operation S406), the print application 209 closes the HTTP connection started in operation S405. Then, in operation S407, the print application 209 instructs the OS 201 to stop print data transmission. Consequently, the OS 201 transmits the data subsequent to information 310 in FIG. 3. At this point, since the transmission of all of the job data has finished, the chunk size is 0. Then, the HTTP connection started in operation S401 is closed.

Next, the flow of the processing performed on the printing apparatus 100 side will be described using FIGS. 5 to 9. This processing is performed by the CPU 101 in the printing apparatus 100 loading into the RAM 103 the set of software programs illustrated in FIG. 2 stored in the ROM 102, for example, and executing those programs.

FIG. 5 is a flowchart illustrating a flow of processing performed to switch whether analysis of a MIME-data division character-string (boundary) needs to be performed during print processing based on WSD. When the printing apparatus 100 is switched on, in operation S501, the CPU 101 in the printing apparatus 100 sets the analysis state (whether analysis is needed or not) of a MIME-data division character-string during print processing based on WSD, as one of initialization processes, to "analysis processing state (=analysis necessary)". Information indicating this state is stored in the RAM 103.

In operation S502, the printing apparatus 100 waits to receive an instruction from the PC 200. Examples of such instructions may include an HTTP connection request, a printer information acquisition request, a job data reception request, an instruction to start print data transmission, and an instruction to stop print data transmission. In the present exemplary embodiment, description of the instructions other than the instruction to start print data transmission and the instruction to stop print data transmission will be omitted.

In operation S503, if it is determined that an instruction to start print data transmission has been received from the PC 200 (YES in operation S503), processing for skipping boundary analysis should be performed. Accordingly, the processing proceeds to operation S504. In operation S504, the printing apparatus 100 confirms that print data may be received, and transmits an Ack. Then, in operation S505, the printing apparatus 100 sets the boundary analysis state stored in the RAM 103 to "analysis skip state (=analysis unnecessary)". On the other hand, in operation S506, if it is determined that an instruction to stop print data transmission was received from the PC 200 (YES in operation S506), processing for stopping skipping boundary analysis should be performed. Accordingly, the processing proceeds to operation S507. In operation S507, the printing apparatus 100 confirms that the print processing could be performed normally, and transmits an Ack. Then, in operation S508, the printing apparatus 100 sets the boundary analysis state stored in the RAM 103 to "analysis processing state (=analysis necessary)".

Thus, the printing apparatus 100 switches between a boundary analysis state and a skip state based on the reception of an instruction to start print data transmission and an instruction to stop print data transmission from the PC 200.

Next, the flow of print processing in the printing apparatus 100 in which boundary analysis is set to either necessary/unnecessary will be described. FIG. 7 is a sequence diagram illustrating a flow of the exchange of data between the PC 200 and the printing apparatus 100 in chronological order.

When the user issues a print instruction on the PC 200, the print application 209 in the PC 200 instructs the OS 201 to start transmission processing of the print data. In operation S701, the OS 201, which has received the instruction, transmits a PrintJob generation command to the printing apparatus 100 based on the received instruction. In operation S702, the printing apparatus 100, which has received this command, transmits to the PC 200 an "OK" response if the printing apparatus 100 is in a state in which it may start print processing. In operation S703, the PC 200, which has received the OK response, starts an HTTP connection in order to transmit a print command and the print data. When the HTTP connection is successful (YES in operation S704), the PC 200 transmits HTTP header information to the printing apparatus 100. The printing apparatus 100 receives the HTTP header information from the PC 200, specifies the MIME-data division character-strings, and recognizes that chunk format encoding should be performed.

Next, the PC 200 transmits an entity body encoded in chunk format. First, in operation S705, the PC 200 transmits the boundary (the boundary specified above). Since the printing apparatus 100 is in the state illustrated in operation S501 of FIG. 5, the PC 200 analyzes this boundary. The boundary analysis is performed in the printing apparatus 100 by sequentially comparing the character strings included in the data received from the PC with the character string of the above-specified boundary, specifying the place where all of the character strings match, and identifying that place as the division position. Next, in operation S706, the PC 200 transmits a WSD print command 306, and the printing apparatus 100 starts print processing preparation. Then, in operation S707, the PC 200 transmits a boundary 308 indicating the division with the print data, and the printing apparatus 100 analyzes the boundary 308. The processing performed up to this stage corresponds to the processing of up to operation S401 in FIG. 4 performed by the PC 200, and the corresponding processing performed then by the printing apparatus 100.

Next, in operation S708, as performed in operation S402 of FIG. 4, the PC 200 performs a new HTTP connection to the printing apparatus 100 and transmits an instruction to start print data transmission. Then, the PC 200 waits until an Ack is received from the printing apparatus 100 to transmit the print data. In operation S709, if the printing apparatus 100, which has received the instruction to start print data transmission, is capable of performing print processing, it transmits an Ack as performed in operation S504, and sets the boundary analysis skip state as performed in operation S505.

In operation S710, the PC 200 transmits the print data (the chunk size 309 and the print data 310 illustrated in FIG. 3) as performed in operation S404 of FIG. 4. The printing apparatus 100 then receives this print data. At this stage, since the printing apparatus 100 is set to a boundary analysis skip state, boundary analysis of the print data is not performed. The print application 209 in the printing apparatus 100 then performs print data analysis and its conversion to a format that allows print processing, and performs print processing with the printing mechanism 106. More specifically, the print application 209 prints an image based on the print data by applying a recording agent on a recording medium.

In operation S711, when the PC 200 transmits the instruction to stop print data transmission as performed in step S405, the printing apparatus 100 confirms that the print processing could be performed normally. In operation S712, the printing apparatus 100 transmits an Ack as performed in operation S507. Then, in operation S508, the printing apparatus 100 is set to a "boundary analysis processing state".

Next, in operation S713, the PC 200 transmits the data in information 311 to 313 illustrated in FIG. 3 including a boundary as performed in operation S407, and the printing apparatus 100 analyzes these data. In operation S714, if the printing apparatus 100 recognizes that the chunk size is 0, the printing apparatus 100 transmits a response to the printing command 306. Then, in operation S715, the printing apparatus 100 stops the HTTP connection that was receiving the job data.

Thus, the PC 200 may make the printing apparatus 100 skip boundary analysis for the print data section, and the printing apparatus 100 may skip the boundary analysis of that section.

Figure 6:
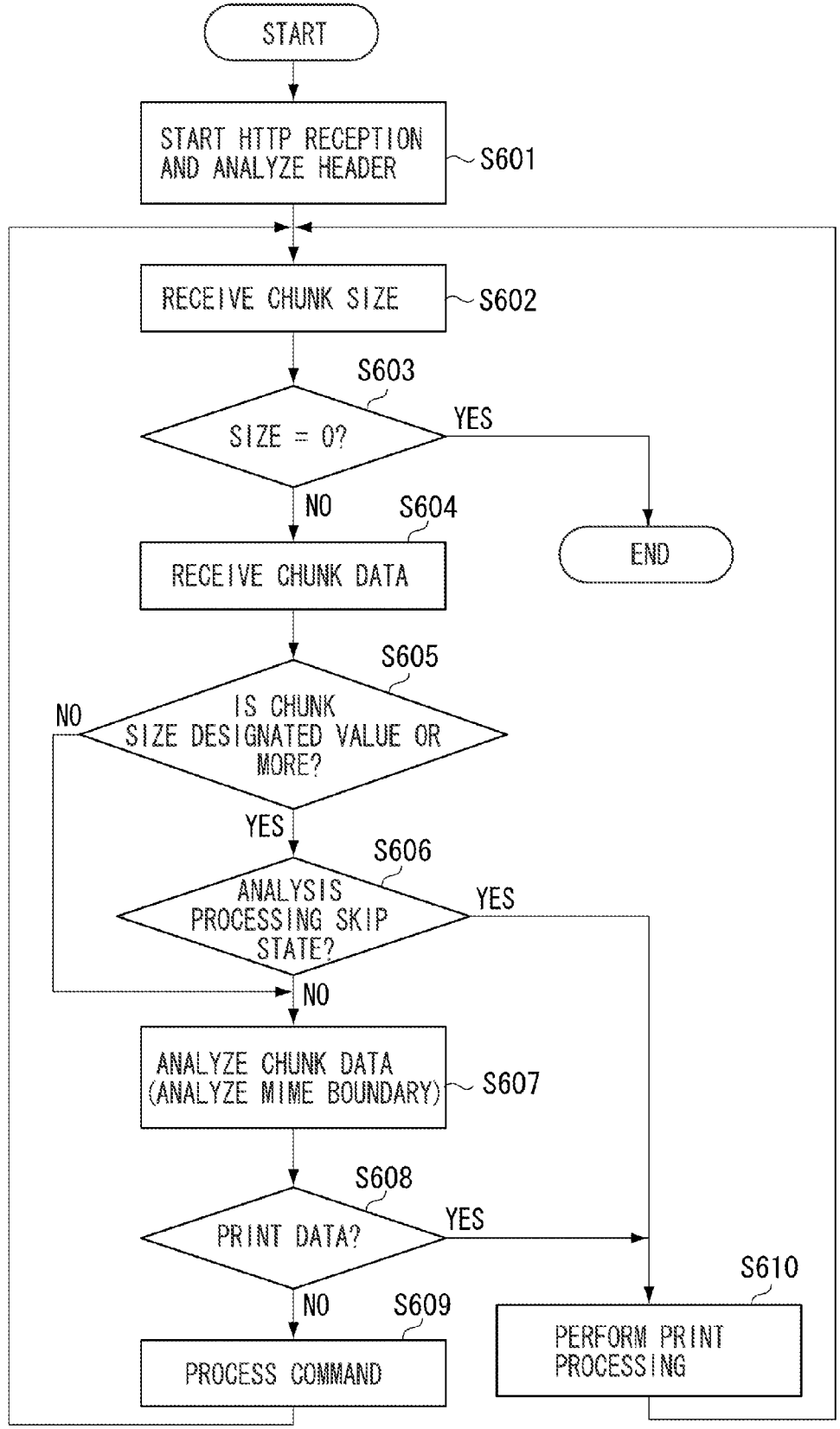
FIG. 6 is a flowchart illustrating a flow of job data reception and processing by a printing apparatus.

Next, another example of the processing performed in the printing apparatus 100 will be described using FIG. 6.

After carrying out the processing of operations S701 to S704 of FIG. 7 in the same manner as described above, in operation S601, when the printing apparatus 100 receives an HTTP connection from the PC 200, the printing apparatus 100 receives HTTP header information including information 301 and 302 illustrated in FIG. 3, and analyzes that information. In this analysis, the printing apparatus 100 extracts the MIME-data division character-string (the character string located in the "MIME-boundary" of information 301) included in the HTTP header information, and stores the extracted string in the RAM 103 to use for subsequent division location determination. Further, the printing apparatus 100 recognizes the chunk format encoding designation and decodes the subsequent entity body as chunk format encoded data.

Next, in operation S602, the printing apparatus 100 receives data indicating the chunk size of information 303, for example, illustrated in FIG. 3. Then, in operation S603, the printing apparatus 100 determines whether the size indicated by the received chunk size data is 0. If it is determined that the size indicated by the received chunk size data is 0 (YES in operation S603), there is no data to follow this reception, and thus the reception processing is stopped. On the other hand, if it is determined that the size indicated by the received chunk size data is not 0 (since the chunk size may not have a negative value, such a value is positive) (NO in operation S603), the processing proceeds to operation S604. In operation S604, the printing apparatus 100 receives the data for that chunk size amount.

In operation S605, the printing apparatus 100 determines whether the size indicated by the received chunk size data is a predetermined size (designated value) or greater. This determination whether the chunk size is a predetermined value or greater is made to enable a determination whether to stop transmission of the print data even if the PC 200 did not transmit an instruction to stop print data transmission or even if the printing apparatus 100 did not receive an instruction to stop print data transmission. Specifically, if the chunk size is less than the designated value (NO in operation S605), the transmission of the print data has already stopped and received data may not be print data. Consequently, the printing apparatus 100 performs boundary analysis in subsequent processing. Since the data size at this stage is small, even if the data received at this point was print data, the processing load would not be high. Further, the designated value may be arbitrarily changed, or may be fixed at a value common in the data size of commands other than a print data command or a boundary character string (e.g., by several bytes).

If it is determined in operation S605 that the chunk size is equal to or greater than the designated value (YES in operation S605), the processing proceeds to operation S606, while if it is determined that the chunk size is less than the designated value (NO in operation S605), the processing proceeds to operation S607. In operation S607, the printing apparatus 100 performs analysis processing even if it is in a boundary analysis skip state.

In operation S606, it is determined whether the printing apparatus 100 is set to a boundary analysis skip state. If the chunk size is equal to or greater than the designated value and the printing apparatus 100 is set to a boundary analysis skip state, the processing proceeds to operation S610. In operation S610, the printing apparatus 100 transfers the chunk data, which is print data, to the print application 209. The print application 209 executes print processing using the printing mechanism 106 based on the received print data. At this stage, the CPU 101 in the printing apparatus 100 does not perform boundary analysis of the received chunk data.

If the chunk size is less than the designated value or if the printing apparatus 100 is not set to a boundary analysis skip state, in operation S607, the printing apparatus 100 performs boundary analysis processing of the chunk data. Specifically, the printing apparatus 100 collates the MIME-boundary character string stored in the RAM 103 and the received chunk data. Then, if the chunk data does not match the boundary character string, the data is print data (YES in operation S608). Thus, the processing proceeds to operation S610, and the printing apparatus 100 performs print processing. On the other hand, if the chunk data matches the boundary character string (e.g., there is a match between information 304 and 308 in FIG. 3), the data is not print data (NO in operation S608) and the processing proceeds to operation S609. In operation 609, the printing apparatus 100 performs WSD command processing. Here, although the determination regarding whether the data is print data is based on whether the data includes a boundary character string. However, the determination whether the data is print data may be made based on another condition as a result of analyzing the chunk data.

Since the reception processing of the subsequent chunk data continues while a command process or a print process is carried on with respect to the received chunk data, the processing returns to operation S602, and the above processing is repeated until data of a chunk size 0 is received.

Thus, after the instruction to start print data transmission is received, if the chunk size of the received chunk data is less than a designated value, boundary analysis processing is performed. Consequently, for example, if the instruction to stop print data transmission was not received (or could not be received), a print failure in which data like information 312 in FIG. 3 is handled as print data may be prevented. Specifically, boundary analysis processing may be appropriately executed even if the instruction to stop print data transmission caused by a processing failure on the PC 200 side or a communication failure between the PC 200 and the printing apparatus 100 may not be received by the printing apparatus 100.

Thus, by performing the above-described processing, boundary analysis processing for print data may be omitted, so that the processing load of the CPU 101 in the printing apparatus 100 may be reduced. Further, the hardware for boundary analysis processing (the hardware intended to support boundary analysis processing in the CPU 101) may be eliminated. In addition, like in the above example, instructions to start and stop print data transmission are carried out using a WSD command. Accordingly, by utilizing a common WSD protocol, switching whether boundary analysis is necessary or not, may be made, which enhances efficiency. Moreover, versatility may also be improved.

As in the above example, if the instructions to start and stop print data transmission are transmitted in parallel with a session that is different from the session for transmitting the print data, the PC 200 needs to transmit the respective instructions based on the situation of the start and stop of print data transmission. More specifically, the PC 200 needs to transmit the instruction to start print data transmission after the data prior to information 309 in FIG. 3 is transmitted, but before information 309 is transmitted. Further, the PC 200 also needs to transmit the instruction to stop print data transmission after the data prior to information 311 is transmitted but before information 311 is transmitted.

Further, in the above example, if a plurality of print data having different contents (e.g., print data based on respectively different print jobs) is transmitted, the boundary data may be sandwiched by the division positions. In such a case, the instruction to stop print data transmission and the instruction to start transmission of the following print data are transmitted at the print data division.

Moreover, in the above example, although the omitted portion of boundary analysis is the print data portion, the present invention may also be applied to jobs other than print jobs. For example, for a data transmission job, the analysis processing of the transmission data portion, and for a store job, the analysis processing of the accumulation target data portion, may be omitted by similarly transmitting the instructions to start and stop the processing. In whichever case, the one disclosed aspect of the embodiments is applicable as long as the analysis of the division data may be omitted for the portion of the processing data that is the job processing target (a command or a portion that is not division data).

In addition, the processing data portion may also be determined by referring to the size of the data instead of using an instruction to start the processing. Specifically, this determination may be performed by setting the upper limit of the size that may serve as a command, as the designated value described in FIG. 6, and determining whether the size of the data received by a job processing apparatus (printing apparatus 100 etc.) exceeds this value. In this method, since data having a large size is the processing data, job processing is executed while omitting analysis processing of the division data. Data having a small size is subjected to division data analysis. In this case, even if data having a small size is the processing data, the processing load does not increase because the size is small.

Further, in the above example, a MIME format is described as an example of the data in a multi-part format. However, one disclosed aspect of the embodiments may also be employed in various formats other than MIME, as long as the divisions of the respective parts need to be determined by analyzing division data.

Figure 10:
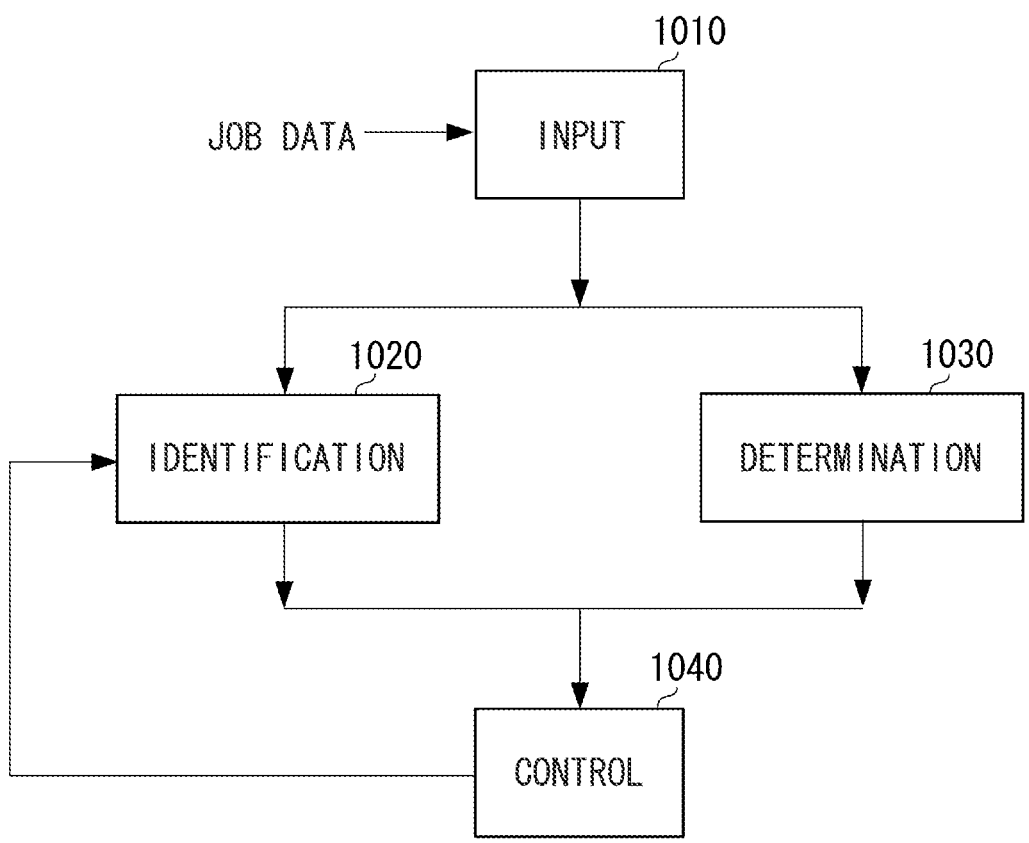
FIG. 10 illustrates an example of a printing apparatus according to one embodiment.

FIG. 10 illustrates an example of the printing apparatus 100 according to one embodiment. The printing apparatus 100 may include an input unit 1010, an identification unit 1020, a determination unit 1030, and a control unit 1040. The printing apparatus 100 may include more or less than the above components. Each of these units may correspond to a module stored in a memory device (e.g. the ROM 102 as shown in FIG. 1) as part of a computer-executable program, or a firmware device that contains the code to execute the corresponding operations, or a logic circuit that implements the corresponding operations or functionalities, or a combination of any of the above.

The input unit 1010 may be configured to input job data in a multi-part format. The job data input by the input unit 1010 may be divided into a plurality of blocks.

The identification unit 1020 may be configured to identify a division position of each part of job data input by the input unit 1010.

The determination unit 1030 may be configured to determine a portion of processing data that is a job processing target among the job data input by the input unit 1010. The determination unit 1030 may be further configured to determine a start position of processing data by receiving information indicating a transmission start of processing data that is transmitted from a job data supply source. The determination unit 1030 may be further configured to determine a stop position of processing data by receiving information indicating a transmission stop of processing data that is transmitted from a job data supply source.

The control unit 1040 may be configured to perform control so that identification of a division position by the identification unit 1020 may be skipped at a location that is determined to be a processing data portion by the determination unit 1030 among the job data input by the input unit 1010. The control unit 1040 may be further configured to cause the identification unit 1020 to identify a division position as to data having a divided block size that is smaller than a predetermined size.

Further, the present exemplary embodiment may also be realized by supplying software (e.g., a program or a set of instructions) for realizing the functions of the above exemplary embodiments to a system or an apparatus via a network or via various storage media, and having a computer (a CPU or a micro processing unit (MPU)) of the system or apparatus read and execute the program or the instructions recorded/stored on a memory device or a non-transitory storage medium to perform operations or functions of the above-described embodiments. In this case, this program and the recording medium on which the program is recorded/stored constitute one disclosed aspect of the embodiments. In addition, the program may be executed by one computer, or by a plurality of computers linked together.

Disclosed aspects of the embodiments may be realized by an apparatus, a machine, a method, a process, or an article of manufacture that includes a non-transitory storage medium having a program or instructions that, when executed by a machine or a processor, cause the machine or processor to perform operations as described above. The method may be a computerized method to perform the operations with the use of a computer, a processor, or a programmable device. The operations in the method involve physical objects or entities representing a machine or a particular apparatus (e.g., job data, job processing apparatus, job data supply apparatus). In addition, the operations in the method transform the elements or parts from one state to another state. The transformation is particularized and focused on identification of division position of each part of job data input. The transformation provides a different function or use such as skipping identification of a division position.

In addition, elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any optical, electromechanical, electromagnetic, or electronic devices. The term software generally refers to a logical structure, a method, a procedure, a program, a routine, a process, an algorithm, a formula, a function, an expression, etc. A software implementation typically includes realizing the above elements (e.g., logical structure, method, procedure, program) as instruction codes and/or data elements embedded in one or more storage devices and executable and/or accessible by a processor, a CPU/MPU, or a programmable device as discussed above. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations.

All or part of an embodiment may be implemented by various means depending on applications according to particular features, functions. These means may include hardware, software, or firmware, or any combination thereof. A hardware, software, or firmware element may have several modules or units coupled to one another. A hardware module/unit is coupled to another module/unit by mechanical, electrical, optical, electromagnetic or any physical connections. A software module/unit is coupled to another module by a function, procedure, method, subprogram, or subroutine call, a jump, a link, a parameter, variable, and argument passing, a function return, etc. A software module/unit is coupled to another module/unit to receive variables, parameters, arguments, pointers, etc. and/or to generate or pass results, updated variables, pointers, etc. A firmware module/unit is coupled to another module/unit by any combination of hardware and software coupling methods above. A hardware, software, or firmware module/unit may be coupled to any one of another hardware, software, or firmware module/unit. A module/unit may also be a software driver or interface to interact with the operating system running on the platform. A module/unit may also be a hardware driver to configure, set up, initialize, send and receive data to and from a hardware device. An apparatus may include any combination of hardware, software, and firmware modules/units.

While the embodiments of the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-189456 filed Aug. 26, 2010, which is hereby incorporated by reference herein in its entirety.

What is claimed is:

1. A job processing apparatus comprising:
an input unit configured to input job data in a multi-part format;
an identification unit configured to identify a division position of each part of job data input by the input unit;
a determination unit configured to determine a portion of processing data that is a job processing target among the job data input by the input unit, the portion being specified by a start position and a stop position; and
a control unit configured to perform control so that identification of the division position by the identification unit is skipped at a location that is determined to be the portion of processing data by the determination unit among the job data input by the input unit,
wherein job data input by the input unit is divided into a plurality of blocks, and wherein the control unit is configured to cause the identification unit to identify the division position for data having a divided block size that is smaller than a predetermined size.

2. The job processing apparatus according to claim 1, wherein the determination unit is configured to determine the start position of the portion of processing data by receiving information indicating a transmission start of processing data that is transmitted from a job data supply source.

3. The job processing apparatus according to claim 1, wherein the determination unit is configured to determine the stop position of the portion of processing data by receiving information indicating a transmission stop of processing data that is transmitted from a job data supply source.

4. The job processing apparatus according to claim 1, wherein job data input by the input unit is divided into a plurality of blocks, and
wherein the control unit is configured to cause the identification unit to identify the division position as to data having a divided block size that is smaller than a predetermined size.

5. A job processing method for performing job processing based on job data received by a job processing apparatus, which is transmitted from a job data supply apparatus that transmits job data in a multi-part format, the method comprising, in a job processing apparatus:
identifying a division position of each part of job data transmitted from the job data supply apparatus;
determining a portion of processing data that is a job processing target among the job data transmitted from the job data supply apparatus, the portion being specified by a start position and a stop position; and
performing control so that identification of the division position is skipped at a location that is determined to be the portion of processing data among the job data transmitted from the job data supply apparatus,
wherein the job data is divided into a plurality of blocks, and
wherein identifying comprises identifying the division position for data having a divided block size that is smaller than a predetermined size.

6. The job processing method according to claim 5, wherein data indicating a transmission start and a transmission stop of processing data is transmitted by a job data supply apparatus, and
wherein the portion of processing data is determined based on the data indicating a transmission start and a transmission stop of the processing data transmitted from the job data supply apparatus.

7. The job processing method according to claim 6, wherein data is transmitted based on a Web service for devices (WSD) by a job data supply apparatus.

8. The job processing method according to claim 7, wherein data indicating a transmission start and a transmission stop of processing data corresponding to the start position and the stop position, respectively, is transmitted by a job data supply apparatus based on a GetPrinterElements command of WSD.

9. A non-transitory computer-readable storage medium storing a program, which, when executed by a machine or a processor, causes the machine or the processor to perform operations comprising:
inputting job data in a multi-part format;
identifying a division position of each part in the input job data;
determining a portion of processing data that is a job processing target among the input job data, the portion being specified by a start position and a stop position; and
performing control so that identification of the division position is skipped at a location that is determined to be the portion of processing data among the input job data job,
wherein the job data is divided into a plurality of blocks, and
wherein identifying comprises identifying the division position for data having a divided block size that is smaller than a predetermined size.

* * * * *